United States Patent [19]

Matsumiya et al.

[11] Patent Number: 5,291,662
[45] Date of Patent: Mar. 8, 1994

[54] SIMPLE THREE-DIMENSIONAL MEASURING MACHINE

[75] Inventors: Sadayuki Matsumiya; Yukiji Yoda; Masanori Arai; Takao Kawabe, all of Kanagawa, Japan

[73] Assignee: Mitutoyo Corporation, Tokyo, Japan

[21] Appl. No.: 952,054

[22] Filed: Sep. 28, 1992

[30] Foreign Application Priority Data

Sep. 30, 1991 [JP] Japan .................................. 3-87438
Sep. 30, 1991 [JP] Japan .................................. 3-278581
Mar. 30, 1992 [JP] Japan .................................. 4-74144

[51] Int. Cl.$^5$ ............................................. G01B 5/03
[52] U.S. Cl. ................................... 33/503; 33/1 M
[58] Field of Search ................ 33/503, 1 M; 206/523

[56] References Cited

U.S. PATENT DOCUMENTS

| | | | |
|---|---|---|---|
| 3,818,596 | 6/1974 | Stemple et al. | 33/503 |
| 4,106,597 | 8/1978 | Shook et al. | 206/523 |
| 4,437,151 | 3/1984 | Hurt et al. | 33/503 |
| 4,630,381 | 12/1986 | Sakata et al. | 33/503 |
| 4,640,418 | 2/1987 | Lowry | 206/523 |
| 4,964,221 | 10/1990 | Breyer et al. | 33/503 |
| 5,040,678 | 8/1991 | Lenmark, Sr. et al. | 206/523 |
| 5,058,745 | 10/1991 | Warner et al. | 206/523 |
| 5,068,971 | 12/1991 | Simon | 33/503 |
| 5,072,522 | 12/1991 | Stott et al. | 33/503 |
| 5,173,613 | 12/1992 | Henry et al. | 33/1 M |

FOREIGN PATENT DOCUMENTS

59-218902 12/1984 Japan .

Primary Examiner—William A. Cuchlinski, Jr.
Assistant Examiner—C. W. Fulton
Attorney, Agent, or Firm—Flynn, Thiel, Boutell & Tanis

[57] ABSTRACT

A simple three-dimensional measuring machine 1 having a simple structure which enables the assembly thereof by the end users, and a packing case 100 for facilitating a transport of the machine 1. A pair of columns used when necessity arises and the X axis member 5 are assembled and disassembled and the X slider 6 and the Y slider 7 are also assembled and disassembled through a first means 20 for adjusting the angles therebetween. The Y axis member 8 and the Z slider 9 which has a Z axis member 11 are connected through a second means 30 for adjusting the angles therebetween. The packing case 100 for transfer has a first packing case to house the column 3 and the height adjustment pedestal 2, a second packing case to house the X axis member 5 and the X slider 6, a third packing case to house the Y axis member 8 with the Y slider 7 and the Z slider 9 with the Z axis member 11 connected through the second means 30 for adjusting the angle and a Y-Z axis cover 17, and an exterior packing case.

10 Claims, 16 Drawing Sheets

F I G. 12
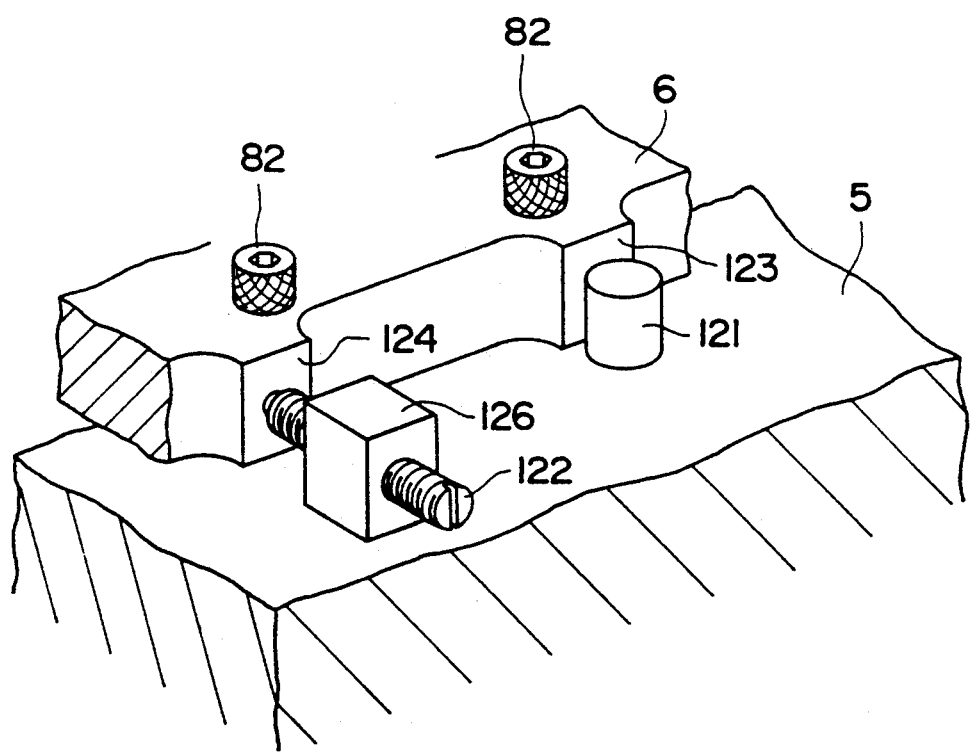

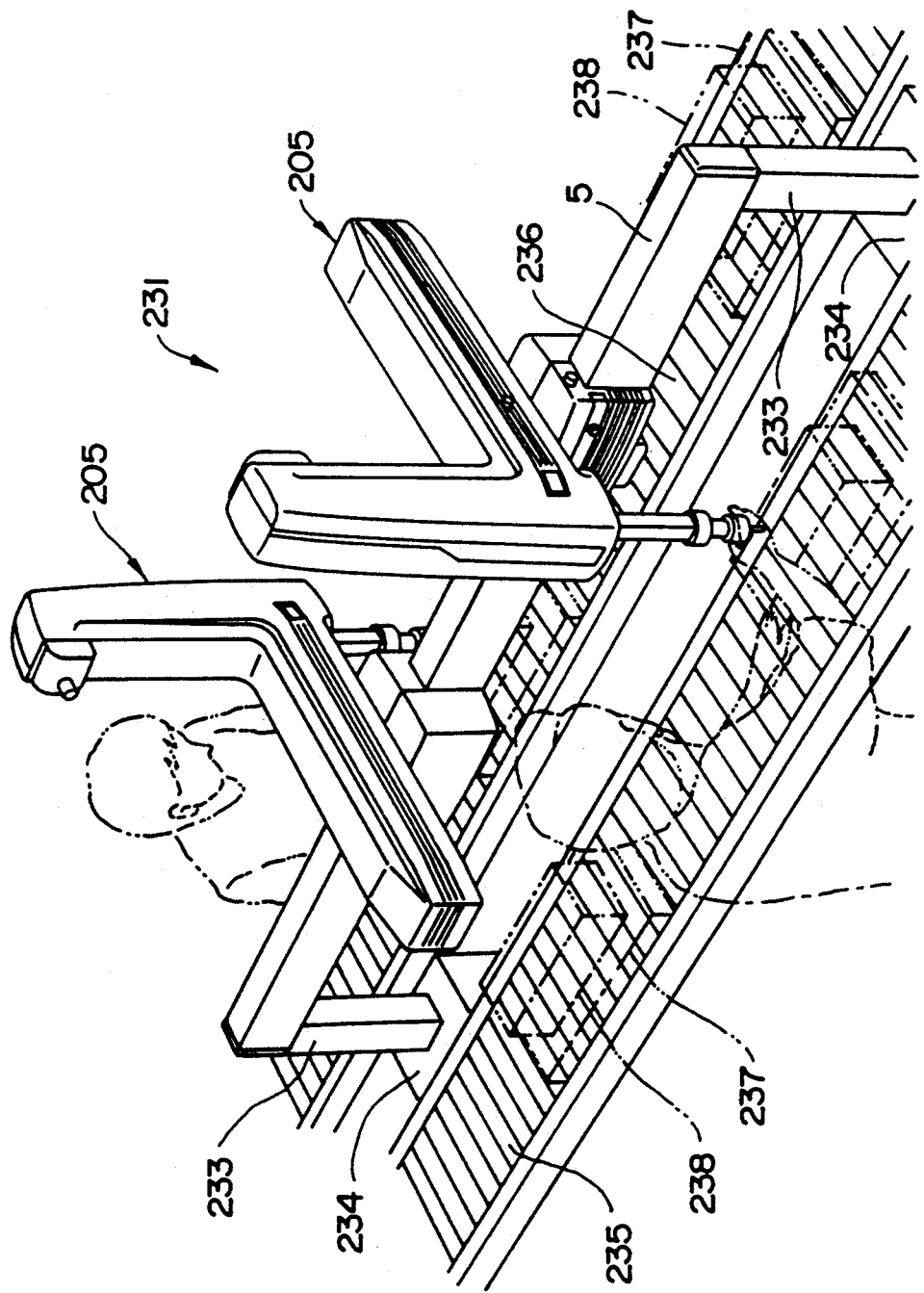

SIMPLE THREE-DIMENSIONAL MEASURING MACHINE

BACKGROUND OF THE INVENTION

1. Field of the Invention

The present invention relates to a three-dimensional measuring machine and especially to a simple three-dimensional measuring machine which is transferred to the scene and assembled easily after being disassembled by each set part.

2. Description of the related art

Various types of three-dimensional measuring machines represented by the boom-type and the planer-type, have been developed so far. These three-dimensional measuring machines are generally large and they are required to have super-high precision. As a result, they are usually assembled in the factory of the manufacturer and then transported to the end use site. Otherwise they are transported to the end use site after being disassembled, but these conditions are very inconvenient for users to handle because experts in assembling from the factory need to disassemble the machine, travel with the machine and then assemble it at the end use site.

Conventional three dimension measuring machines have a disadvantage of high prices because the end users have to depend on the manufacturer for assembling as mentioned above. On the other hand, it is desirable to develop three-dimensional measuring machines which can be used simply and easily like calipers, micrometers, and height gages.

The purposes of the invention are to supply a simple and easy three-dimensional measuring machine at a low price which can be easily used and users can assemble and disassemble, to supply a container to transfer or transport this simple three-dimensional measuring machine which is packaged by the set unit, and to provide a method for adjusting the right angle between each axis member of the simple three-dimensional measuring machine.

SUMMARY OF THE INVENTION

In the present invention whose aim is to meet these purposes, an X slider which can slide freely along the X axis and a Y slider which can slide freely in the relation with the Y axis are so arranged as to be disassembled.

More specifically, the three-dimensional measuring machine in the present application has the characteristics of being composed of an X axis member, and X axis slider which is supported to slide freely along the X axis member, a Y slider which is mounted on the X slider so that the Y slider can be assembled and disassembled through a first means for adjusting the angle, a Y axis member which is supported to slide freely along the horizontal axis in the relation with the Y slider, a Z slider which is mounted to one end of the Y axis member through a second means for adjusting the angle, a Z axis member which is supported to slide freely along the vertical axis in the relation with the Z slider and which has a measuring element at the bottom end thereof, and a counterbalance mechanism or balance equipment which is connected to the Z axis member and is supported by a body at the above-mentioned Z slider in condition to have the balance power corresponding to the weight of the Z axis member.

In the present invention, the X axis member is mounted on a column which the manufacturer prepares in advance, or an appropriate support member which users prepare, such as a mount which is arranged in the production line, frames of various equipments and so on.

The present invention also refers to a packing case for facilitating a transporting or transferring of the simple three-dimensional measuring machine is composed of a packing, case of a column part which is used as necessity requires, a first packing case for the X axis member houses the X axis member and the X slider, a first packing case for Y-Z axis member which houses the Y and Z axis members in assembled condition and a Y-Z axis cover which covers these members so that the L-shaped opening faces each other, and an exterior case which stacks each of the packing cases to house them.

The present invention still refers to an adjustment method of the right angle between each axis member, which is to set a right angle measurement standard on the foundation bed which is arranged in correspondence to the position where the three-dimensional measuring machine is placed, to place one side of the right angle measurement standard in parallel with the X axis member by transferring the measuring element along the one side of the right angle measurement standard, to adjust so that the other side and the Y axis member is put in parallel, that is, the X axis member is right-angled with the Y axis member by contacting the measuring element with the other side which is at right angle with the above-mentioned one side and by a X-Y axis adjustment mechanism which is provided in the first means for adjusting the angle, to adjust the right angle between the Y axis member and the Z axis member by a Y-Z axis adjustment mechanism which is provided in the second means for adjusting the angle, and to adjust the right angle between the Z axis member and the X axis member by a Z-X axis adjustment mechanism which is provided in the first or the second means for adjusting the angle.

The simple three-dimensional measuring machine based on the present invention has the right angle between each axis member adjusted by the adjustment methods such as mentioned above in the factory of the manufacturer before the X slider provided on the X axis member and the Y slider are disassembled at the position of the first means for adjusting the angle. The machine is united in the unit of X axis member part composed of the X axis member and the X slider and the unit of Y-Z axis member part composed of the Y slider, the Y axis member, the second means for adjusting the angle, the Z slider and the Z axis member. And then, they are housed in the above-mentioned packing cases to be transferred to the factories of the users. On this occasion, if the simple three-dimensional measuring machine has columns, the columns and the X axis member are disassembled and the column part unit composed of the columns and so on are made and this unit is transferred at the same time. These units can be used as a three-dimensional measuring machine when each unit is taken out, the X axis member is mounted on the column which the manufacturer has prepared or an appropriate support member which the users have prepared, and the Y slider is installed on the X slider provided on the X axis member via the first means for adjusting the angle. On this occasion, since the X slider and Y slider are mounted at the position of the first means for adjusting the angle, the right angle between the X axis member and the Y axis member is set as they stand. Moreover, because the Y axis member and the Z axis member are transferred in an assembled condition, the adjustment of the right angle of these members is unnecessary.

BRIEF DESCRIPTION OF THE DRAWINGS

FIG. 12 is a perspective view which shows an example of transformation of the means for adjusting the angle.

FIG. 16 is a perspective view which shows the fifth embodiment in the case that the present invention is applied to the production line.

DETAILED DESCRIPTION OF THE PREFERRED EMBODIMENT(S)

The embodiment of the present invention is explained as follows according to the attached drawings.

Figure 1:
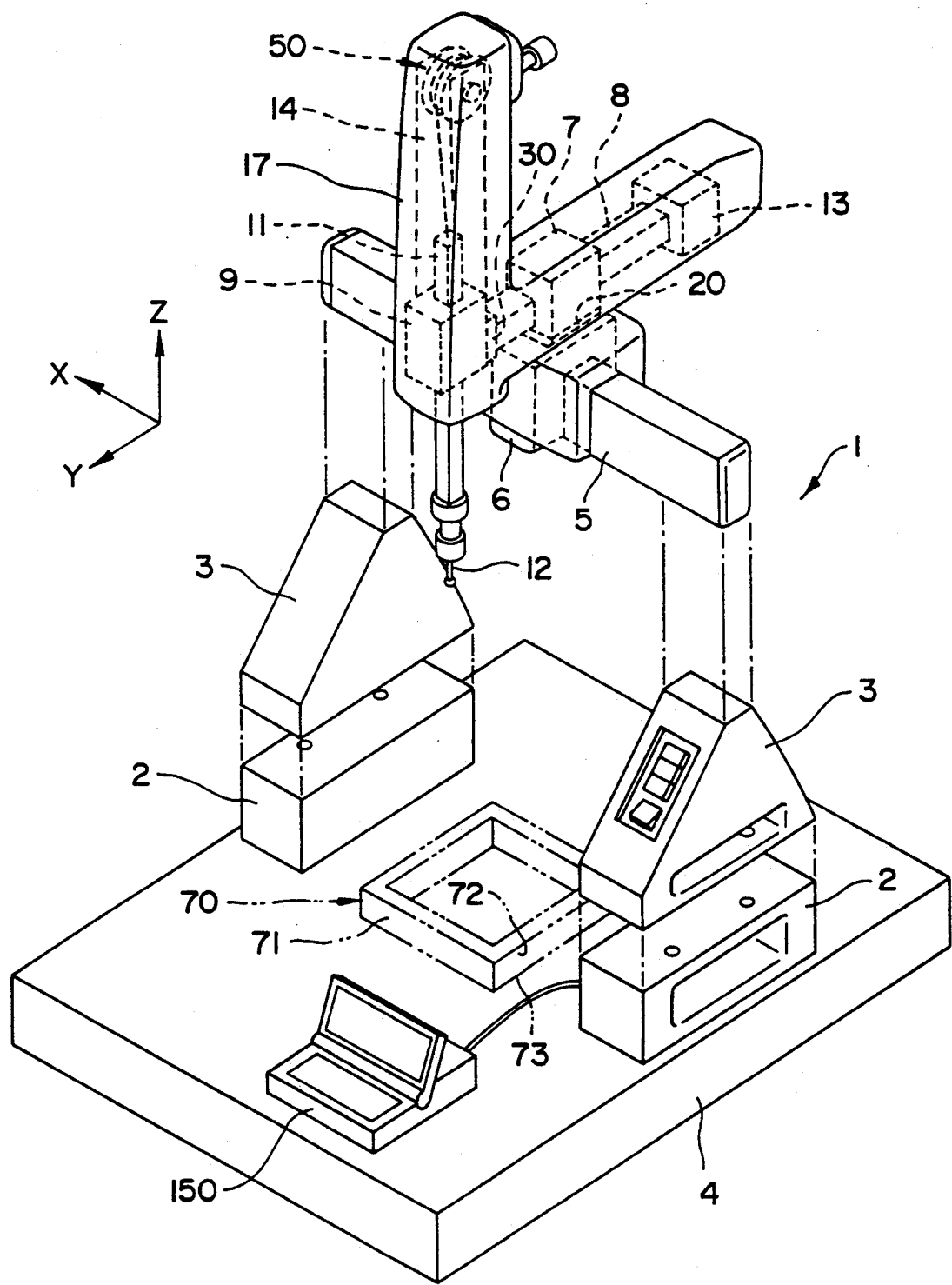
FIG. 1 is a perspective view which shows the first embodiment of the present invention.

In FIGS. 1-11, the first embodiment of the present invention is shown, wherein the whole structure of the simple three-dimensional measuring machine is shown in FIG. 1 according to this embodiment.

As is shown in FIG. 1, the three-dimensional measuring machine 1 has a pair of columns 3 which are mounted to be attached to or removed from the height adjustment pedestal 2 in condition to be placed on the table 4 as a foundation at the set interval. Between both columns 3, the X axis member 5 is connected by bolts to the upper ends of the columns 3. The X slider 6 in the shape of a box is supported so that it can slide freely on the X axis member 5 along the axis direction of the X axis member and, on the X slider 6, the Y slider 7 is firmly fixed through a first means 20 for adjusting the angle. The Y axis member 8 positioned at a right angle with the X axis member 5 is inserted to slide freely in relation with the Y slider 7. In addition a Z slider 9 is mounted on the tip of the Y axis member 8 through a second means 30 for adjusting the angle. The Z axis member 11 as a measurement axis is inserted into the Z slider 9 to slide freely in the vertical direction. In addition, the measuring element 12 such as a touch sensor probe is mounted on the lower part of the Z axis member 11.

On the other hand, a balance weight 13, which has a qualified weight as those of the second means 30 for adjusting the angle attached to the tip of the Y axis member 8, the Z slider 9, the Z axis member 11 and the measuring element 12, is mounted to the back end of the Y axis member 8.

The body 14 which is processed sheet metal is mounted on the upper part of the Z slider 9. Therefore, the Z axis member 11 is supported by the body 14 via the Z slider 9 to slide freely vertically. The balance equipment 50 that can set the balance force corresponding to the weight on the Z axis member 11 including the Z axis member 11 and the measuring element 12 is mounted on the body 14.

The operation means 150 to measure the size and so on of the object to be measured which is not shown in FIG. 1 is connected to the column 3 of the simple three-dimensional measurement machine and is put on a proper position, such as on the table 4. The right angle measurement standard 70 to adjust the right angle of each member of the three-dimensional measurement machine 1 is also put on the table 4, which will be explained in detail later.

Figure 2:
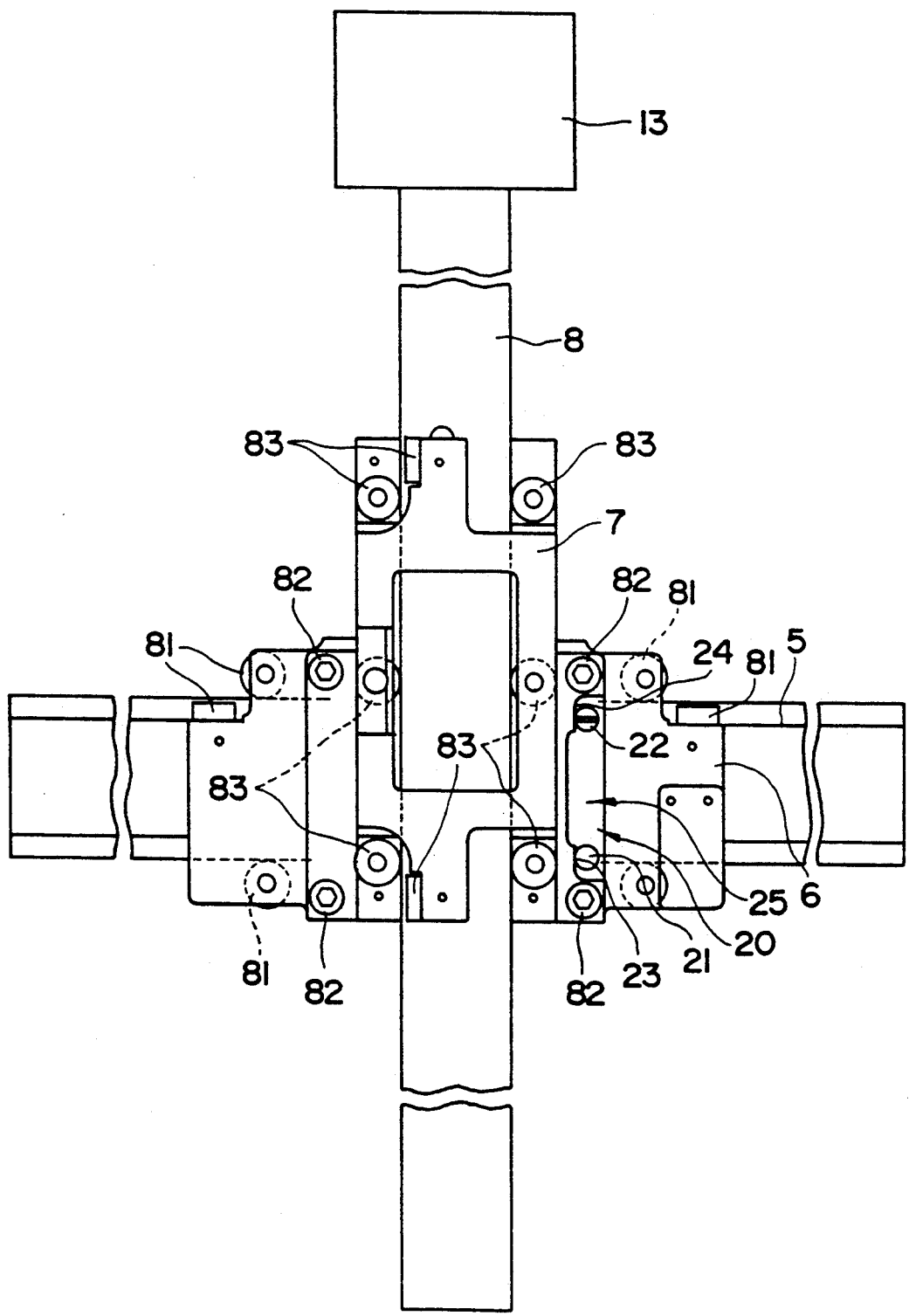
FIG. 2 is a plan view of the X and Y sliders of the embodiment shown in FIG. 1.
Figure 3:
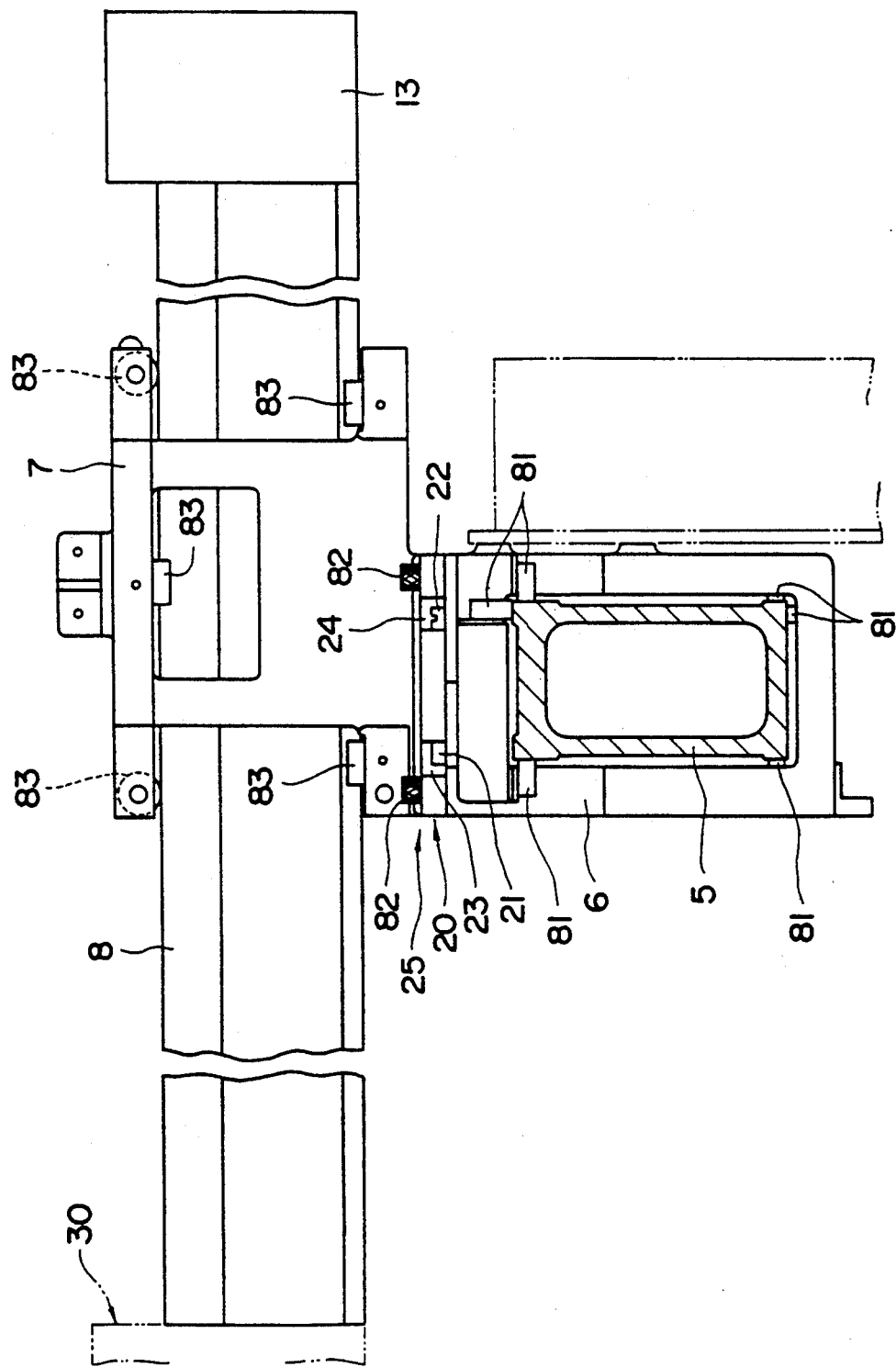
FIG. 3 is a right side-view of FIG. 2.
Figure 4:
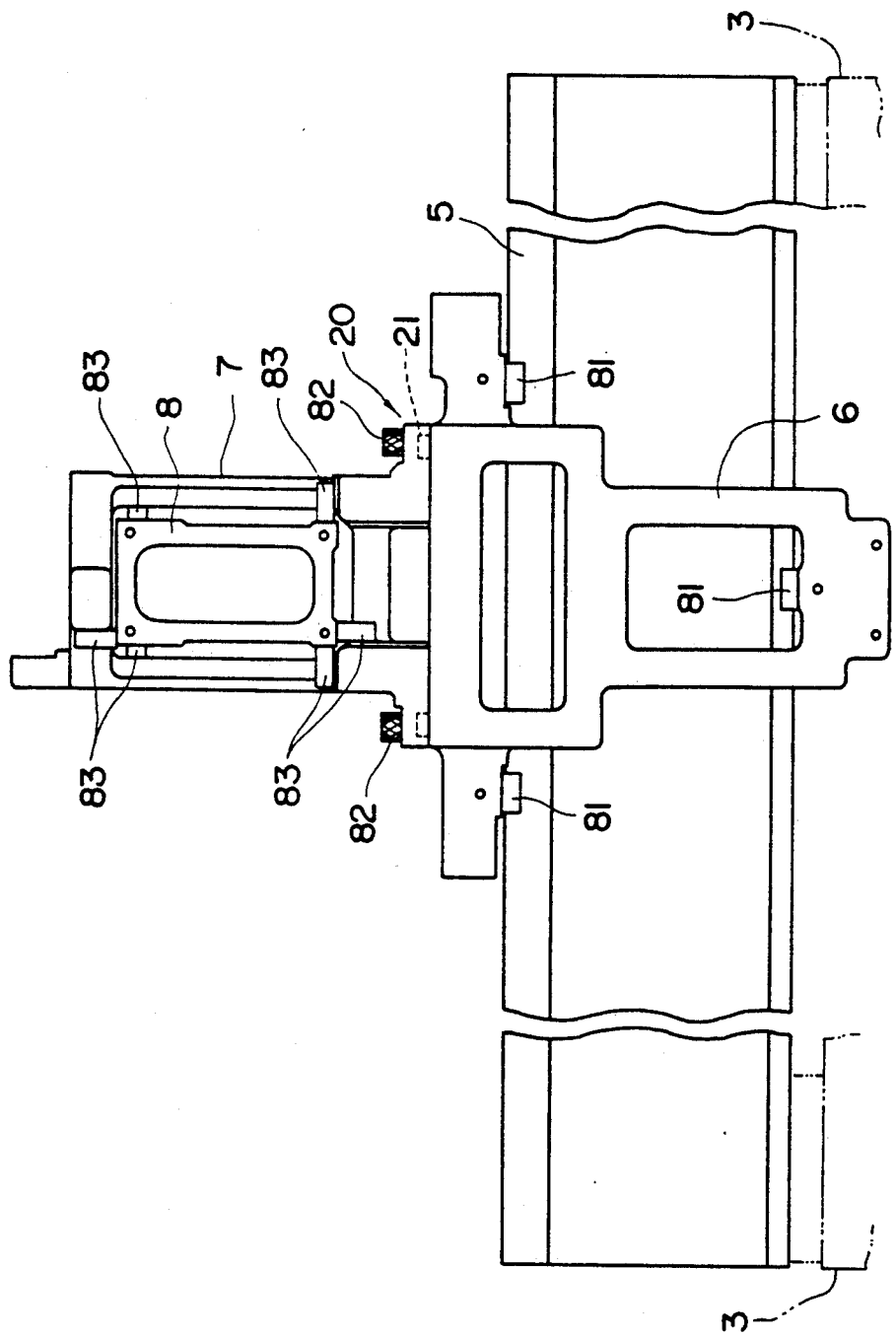
FIG. 4 is a left side-view of FIG. 3.

FIGS. 2-4 shows the state where the X slider 6 and the Y slider 7 are connected through the first means 20 for adjusting the angle. As is shown in these figures, because the X slider 6 is guided to the X axis member 5 through more than one roller 81 and the Y slider 7 is fixed by the securing bolts 82 on the upper side of the X slider 6, the X slider 6 and the Y slider 7 can be assembled and disassembled.

The first means 20 for adjusting the angle has a securing pin 21 and an eccentric pin 22 at the set interval on the upper side of the X slider 6 and each circumference surface of the projected part of the securing pin 21 and the eccentric pin 22 from the X slider 6 abuts on datum level 23, 24 formed on the one side of the Y slider 7.

Figure 5:
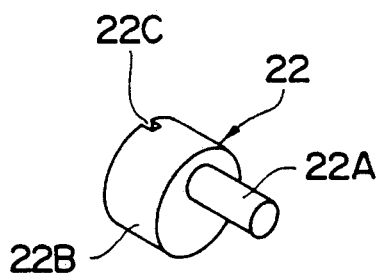
FIG. 5 is a perspective view of the eccentric pin used for the embodiment of FIG. 1.

The securing pin 21 is fixed on the X slider by a proper means such as glue or forcing, while the eccentric pin 22 is fixed temporarily to rotate before adjusting the angle between the X axis member 5 and the Y axis member 8 and, after adjusting the angle, it is fixed with glue and so on. As is shown in FIG. 5, the eccentric pin 22 has the small-diameter axis part 22A inserted into the X slider 6 and a large-diameter axis part 22B which is eccentric to the small-diameter axis part 22A and whose outer circumference abuts on the datum level 24. The adjustment to make the angles between the X slider 6 and the Y slider 7 right and the adjustment to make the angles between the X axis member 5 and the Y axis member 8 right are possible by turning the eccentric pin 22 using the groove 22C provided on the upper side of the large-diameter axis part 22B by inserting the blade of a screw driver and so on (which is not shown in the drawings).

That is, when the eccentric pin 22 is turned, the datum level 24 leans somewhat on the securing pin 21 to adjust the angle between the X slider 6 and the Y slider 7. The assembly and the fixation of the X slider 6 and the Y slider 7 is finished by fixing the eccentric pin 22 so that it cannot be removed and by tightening the securing bolts 82 which are fixed to the X slider 6 after the angle adjustment is finished. In reverse, the X slider 6 and the Y slider 7 are disassembled easily by removing the securing bolts 82. Incidentally, reassembly is made by tightening the securing bolts 82, urging the datum levels 23, 24 of the Y slider 7 to touch the securing pin 21 and the eccentric pin 22, whereby the relative angle between the X slider 6 and the Y slider 7 is made right again.

Incidentally, the X-Y axis adjustment mechanism 25 is composed of the securing pin 21 of the first means 20 for adjusting the angle, the eccentric pin 22 and the datum levels 23, 24.

Like X slider 6, more than one roller 83 is provided with the Y slider 7 and the Y axis member 8 is inserted through these rollers 83 into the Y slider 7.

Figure 6:
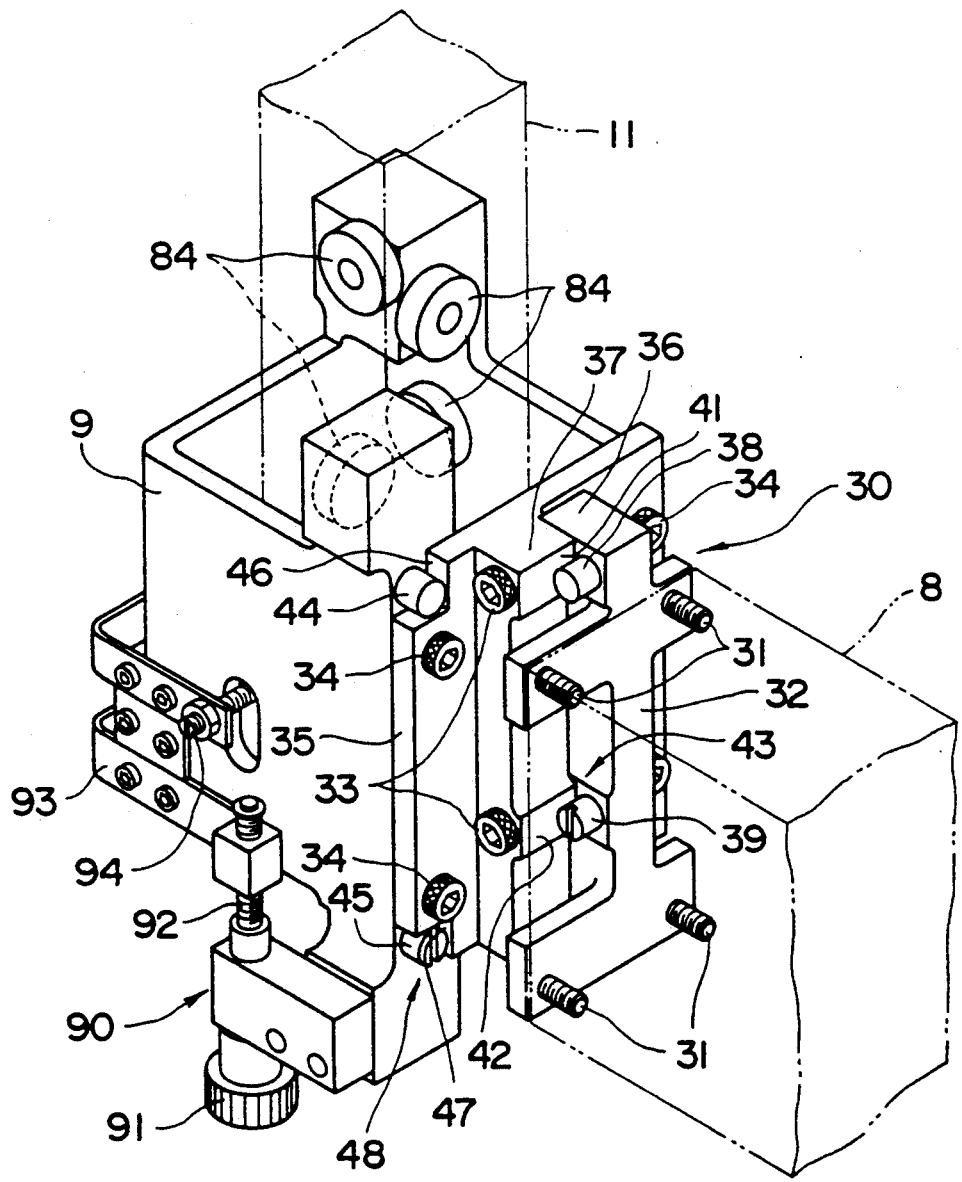
FIG. 6 is a perspective view which shows the second means for adjusting the angle and the Z slider of the embodiment shown in FIG. 1.
Figure 7:
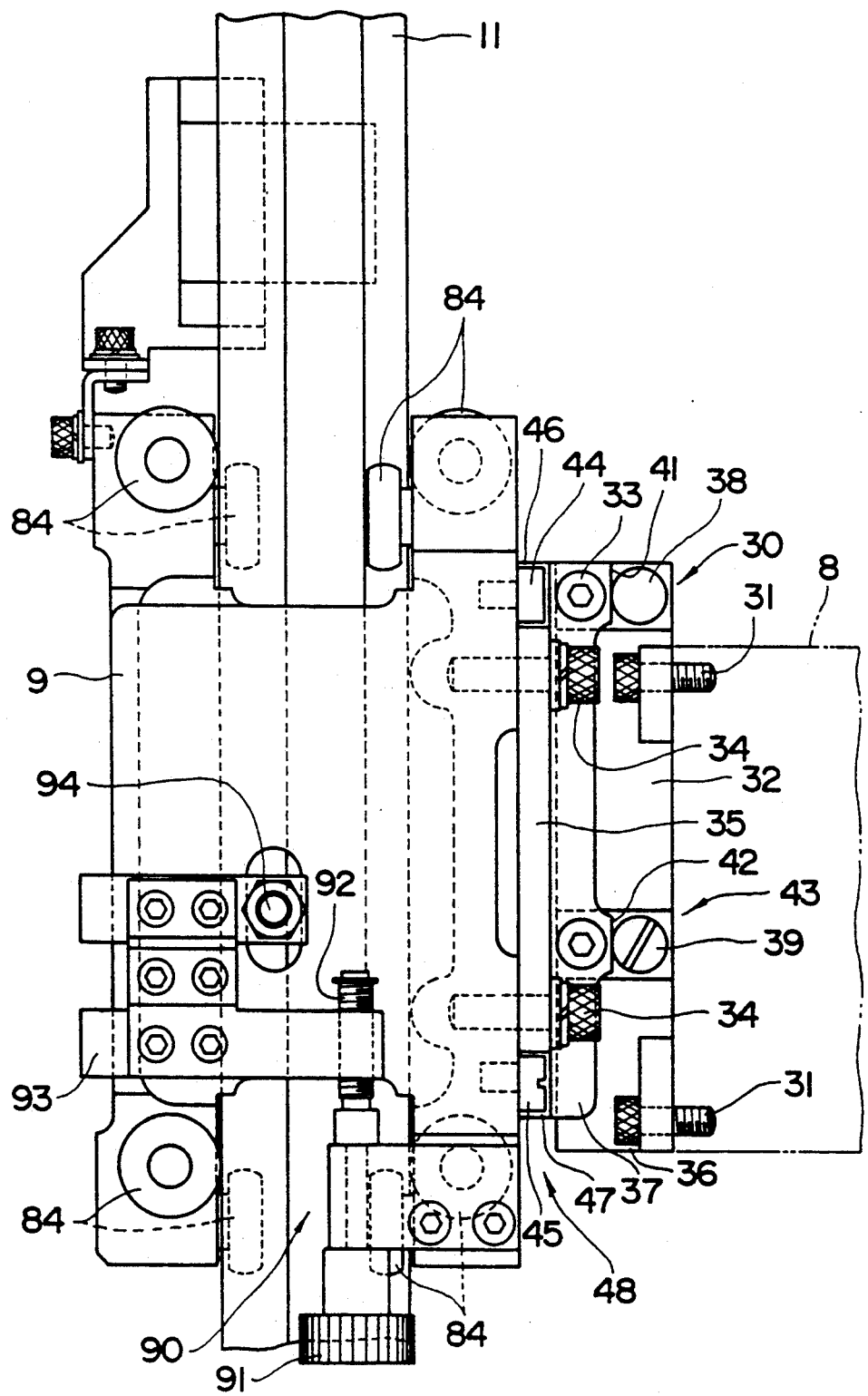
FIG. 7 is the left side-view of FIG. 6.
Figure 8:
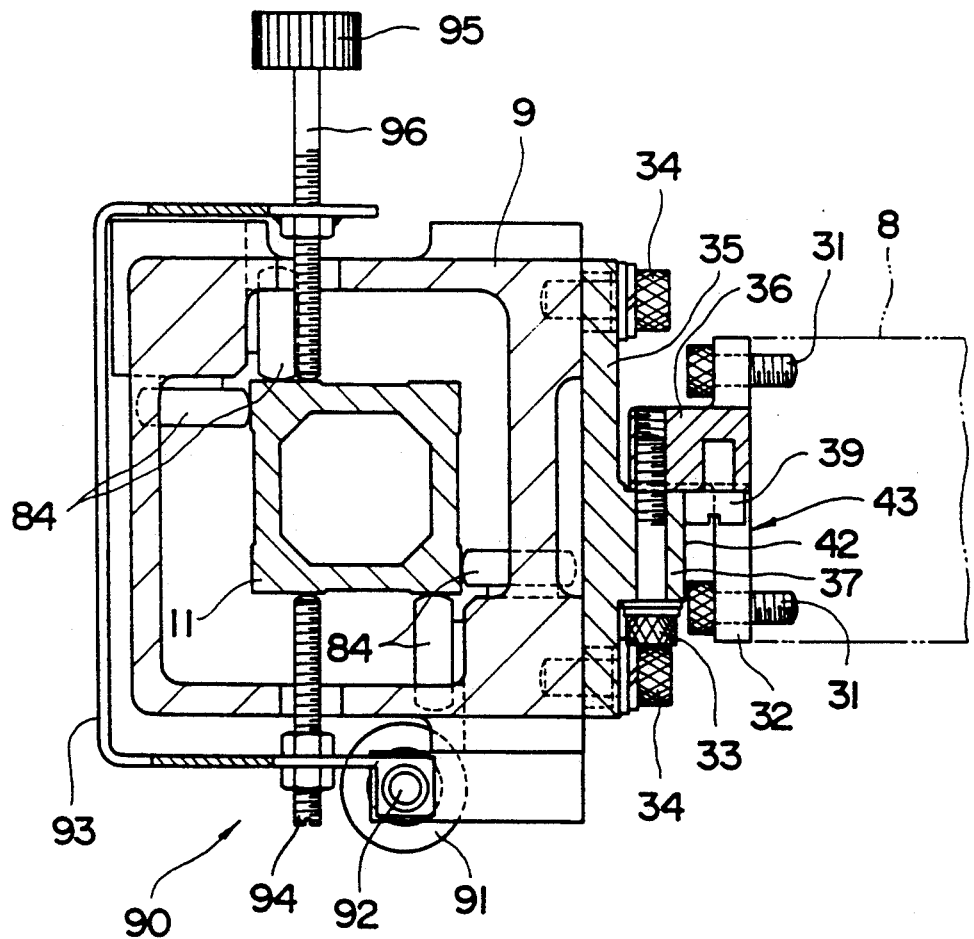
FIG. 8 is a cross-sectional plan view of FIG. 6.

In FIGS. 6–8, the structures of the second means 30 for adjusting the angles and the Z slider 9 are shown in detail.

The second means 30 for adjusting the angles is composed of the first adjustment block 32 fixed by more than one bolt 31 on the tip of the Y axis member 8 and the second adjustment block 35 which can be assembled and disassembled to the first adjustment block 32 using the bolts 33.

The first and second adjustment blocks 32, 35 have ribs 36 and 37 to connect each other with the bolts 33. The securing pin 38 and the eccentric pin 39 at fixed interval are provided with the rib 36 of the first adjustment block 32. While the rib 37 of the second adjustment block 35 has the datum levels 41 and 42 so as to face the securing pin 38 and the eccentric pin 39. The securing pin 38, eccentric pin 39 and datum levels 41 and 42 have the same structures and operations as the above-mentioned the X-Y axis adjustment mechanism 25.

Therefore, when the eccentric pin 39 is turned in the condition of unfastening the bolts 33, the angle between the Y axis member 8 fixed to the first adjustment block 32 and the Z slider 9 fixed to the second adjustment block 35 or the Z axis member 11 can be adjusted to right angle. Incidentally, Y-Z axis adjustment mechanism 43 is composed of the securing pin 38, the eccentric pin 39 and the datum levels 41, 42.

The securing pin 44 and the eccentric pin 45 are provided on one side of the Z slider 9 where the second adjustment block 35 is mounted. While the one side of the second adjustment block 35 has the datum levels 46, 47 in the position where it faces the securing pin 44 and the eccentric pin 45. The securing pin 44, eccentric pin 45 and datum levels 46, 47 have the same structures and the operations as the above-mentioned X-Y axis adjustment mechanism 25.

Therefore, when the eccentric pin 45 is turned in the condition of unfastening the bolts 34, the angle between the second adjustment block 35 and the Z slider 9 or the Z axis member 11 can be adjusted to a right angle. Because the second adjustment block 35 and the X axis member 5 are connected through the first adjustment block 32, the Y axis member 8, the Y slider 7 and the X slider 6, when the eccentric pin 45 is controlled, the angle between the X axis member 5 and the Z axis member 11 can be adjusted to a right angle. Incidentally, the Z-X axis adjustment mechanism 48 is composed of the securing pin 44, the eccentric pin 45, and the datum levels 46, 47.

The Z axis member 11 is inserted through more than one roller 84 to slide inside the Z slider 9. The slight movement mechanism 90 lies between the Z slider 9 and the Z axis member 11. The slight movement mechanism 90 is supported to have a free relation with the Z slider 9 and not to move in the direction of the Z axis. The slight movement mechanism is composed of a slight movement screw 92 which has a control knob 91 on one end, a C-shaped bracket 93 where the slight movement screw 92 is threadedly secured at one end, the bracket 93 being arranged to slide freely in the condition that it surrounds the front side of the Z slider 9 (see FIG. 8), the receipt screw 94 whose point is urged to the one side of the Z axis member 11 by being screwed into the one side of the bracket 93, the lock screw 96 whose point is urged to the other side of the Z axis member 11 and which has the control 95 on the outer side.

Therefore, the Z axis member 11 can slide freely against the Z slider 9 in the condition that the lock screw 96 is loosened and the tip is not urged to the Z axis member 11. The control 91 of the slight movement screw 92 is turned in the condition that the lock screw 96 is screwed in and that the Z axis member 11 is fixed to the bracket 9 by the lock screw 96 and the receipt screw 94, the Z axis member 11 can move slightly in the vertical direction against the Z slider 9.

Incidentally, the mechanisms like the slight movement mechanism 90 are arranged between the X axis member 5 and the X slider 6 and between the Y axis member 8 and the Y slider 7.

Figure 9:
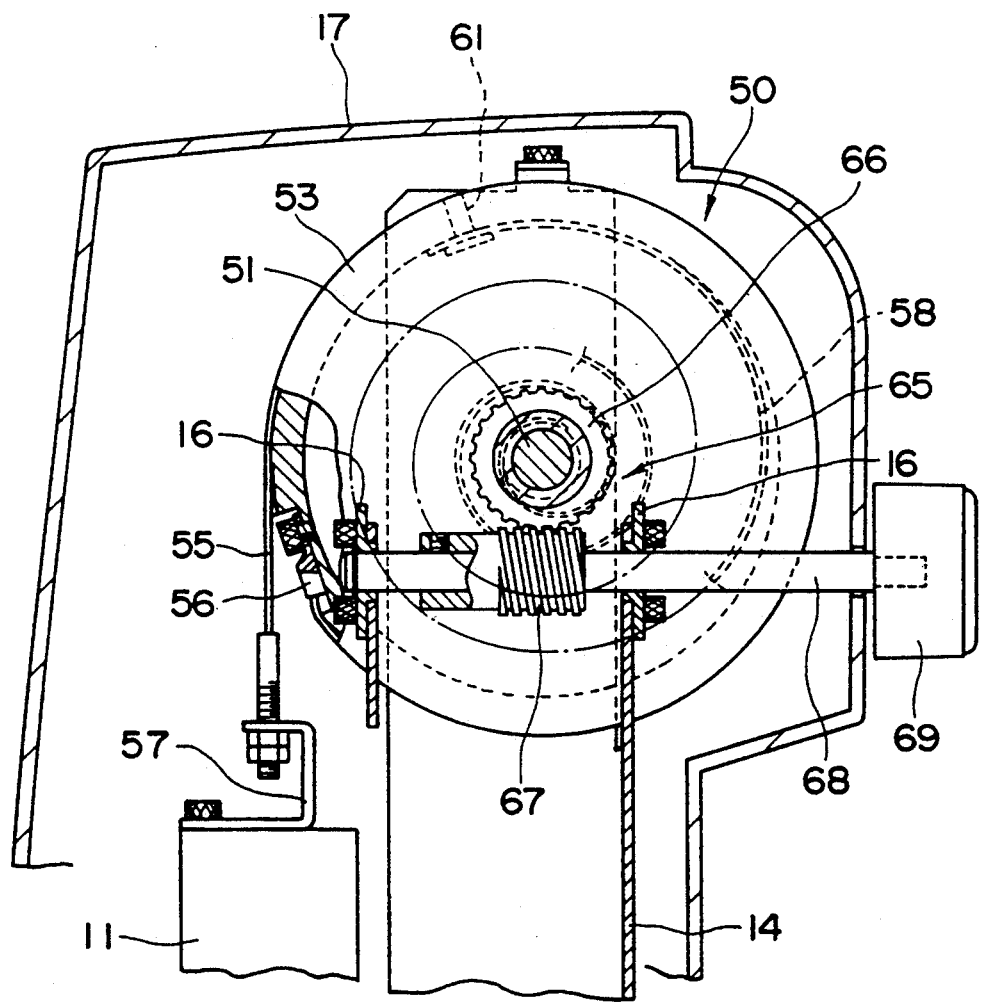
FIG. 9 is a vertical-sectional side-view which shows the balance equipment of the embodiment shown in FIG. 1.
Figure 10:
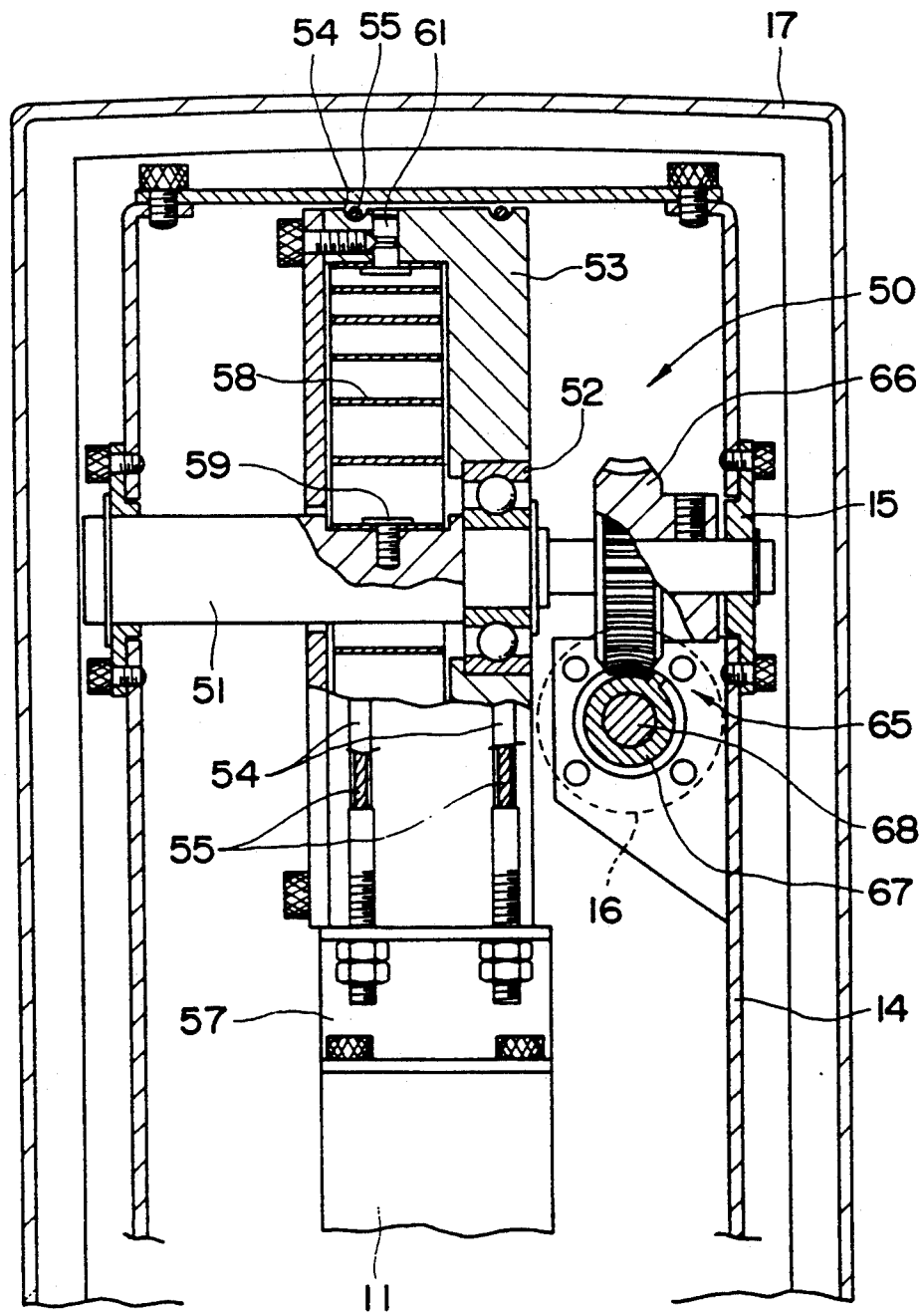
FIG. 10 is an enlarged front vertical-sectional view which cuts part of FIG. 9.

As shown in FIG. 9 and FIG. 10, the counterbalance mechanism or balance equipment 50 has a rotating axle 51 supported to rotate freely inside the body 14 through the bearing 15 and a hollow disc-like rotation drum 53 is supported to rotate freely through the bearing 52 in the center of the rotating axle 51. Two guide grooves 54 are formed on the outer circumference of the rotation drum 53 along the direction of the circumference and the flexible member 55 formed by wires and so on is wound along the guide grooves 54. The one end of the flexible member 55 is fixed on the outer circumference of the drum 53 through the stopper 56 and the other side is connected to the upper end of the Z axis member 11 through the connector 57.

The flexible member 55 can be formed in the shape of a belt as well as in the shape of an elongated strand, such as wire. Also, the material is not limited to metal and it can be made of plastics, natural fiber such as cloth, and hard rubber or rubber including fiber.

The drum 53 is provided with a spiral spring 58 which provides a balance power compensating the weight of the Z axis member 11 inside and the inner end of the spiral spring 58 is fixed to the rotating axle 51 by a stopping screw 59 and the outer end is fixed at the inner circumference of the rotation drum 53 lay a pin 61.

The rotating axle 51 is provided with a balance power adjustment means 65 to adjust the balance power of the spiral spring 58. The balance power adjustment means 65 is composed of the worm wheel 66 fixed to the rotating axle 51, the worm 67 which meshes the worm wheel 66, the operation axle 68 where the worm 67 is supported and which is supported to rotate freely through the bearing 16 by the body 14, and the control 69 fixed to the one end of the operation axle 68.

Incidentally, the mark 17 means the cover which covers the surrounding of the Z axis member 11 and the Y axis member 8 and the one end of the operation axle 68 is projected outside of the cover 17 and the control 69 is provided to the part projected from the cover 17 of the operation axle 68.

Next, the operations of the above-mentioned embodiment will be explained.

The measurement of the object to be measured by the simple three-dimensional measuring machine is conducted as that by a general machine. In this machine, the probe 12 is contacted with the object to be measured by the operation of the Z axis member 11 as a measurement axle and the position of the measuring element 12 is detected three-dimensionally by each scale which is not shown in the drawings and is arranged in the direction of the X, Y and Z axis. The measurement is finished by operating the operation means 150 on the basis of the result detected as mentioned above. On this occasion, a balance equipment or counterbalance mechanism 50 has a sufficient amount of balance power to lift the Z axis member a little and is adjusted to stop the axis member by a stopper which is not shown in the drawings.

The adjustment of the balance power of the balance equipment or counterbalance mechanism 50 is conducted by the operation of the control 69. That is, as the control 69 rotates, the worm wheel 66 rotates through the worm 67 and the rotation axle 51 where the worm wheel 66 is fixed at the same time. Hence, the spiral spring 58 whose inner end is fixed to the rotating axle 51 by the stopping screw 59 rotates in the direction of the spiral or in the reversed direction and the spring force of the spiral spring 58 is changed. In this way, the outer end of the spiral spring 58 is fixed to the rotation drum 53 through the pin 61, the power to lift upward of the Z axis member 11 whose upper end is hung through the flexible member 55 and so on is changed and the operation power of the Z axis member 11 and the measuring power of the measuring element 12 are also changed.

The adjustment of the operation power of the Z axis member 11 is conducted according to the nature of the object to be measured, such as the nature of the soft material or the shape and so on.

The adjustment of the right angle between each axis member 5, 8, and 11 of the simple three-dimensional measuring machine is conducted as follows.

First, the right angle measurement standard 70 where right angle is precisely set to make the three side plane 71, 72 and 73 at right angles is arranged to keep the two side planes 71 72 standing straight on the table 4 where the simple three-dimensional measuring machine is mounted and to set the two directions at right angles in the horizontal plane. The X slider 6 is transferred along the X axis member 5 keeping the measuring element 12 in touch with the one side plane 71 to set the two directions at right angles. Among each measured value in the X, Y and Z directions in the middle of the transfer, the position of the right angle measurement standard 70 is adjusted till the measured value in the X axis direction is changed without changing that in the Y axis direction, whereby because the parallel between the one side plane 71 and the X axis direction is secured, the right angle measurement standard 70 is then fixed on the foundation 4 keeping this condition.

Next, the Y axis member 8 is transferred along the Y slider 7 keeping the measuring element 12 in touch with the other side plane 72 at a right angle with the one side plane 71 of the right angle measurement standard 70. Among each measured value in the X, Y and Z axis directions in the middle of the transfer, the X-Y axis adjustment mechanism 25 of the first means 20 for adjusting the angle is adjusted till the measured value in the Y axis direction is changed without changing that in the X axis direction. This adjustment is conducted by rotating the eccentric pin 22 little by little, transferring the Y axis member 8 every time the eccentric pin is rotated and checking the measured value in the X axis direction. After the adjustment is finished, the eccentric pin 22 of the X-Y axis adjustment means 25 is fixed with glue, the securing screw of the eccentric pin which is not shown in the drawings or other proper means and the X slider 6 and the Y slider 7 are fixed by tightening the bolts 82. The right angle between the X axis member 5 and the Y axis member 8 is determined by these operations.

When the right angle between the X axis member 5 and the Y axis member 8 is fixed, the Z axis member 11 should be fixed to the Z slider 9 with the lock screw 96 screwed in.

Next, the adjustment of the right angle between the Y axis member 8 and the Z axis member 11 is conducted by the operation of the Y-Z axis adjustment mechanism 43 in the second means 30 for adjusting the angles.

First, the right angle measurement standard 70 placed on the table 4 is raised with the side plane 72 on the bottom. And the side plane 73 which was at the bottom is positioned to be parallel to the Y axis member 8. After this, the Y axis member 8 is transferred along the Y slider 7 keeping the measuring element 12 in touch with the side plane 73 and the position of the side plane 73 of the angle measurement standard 70 is adjusted not to change the measured value in the X axis direction and the measurement standard 70 is then fixed on the table 4 after the adjustment, whereby, the side plane 73 of the angle measurement standard 70 is set to be parallel to the Y axis member 8.

when the side plane 73 of the right angle measurement standard 70 is set to be parallel to the Y axis direction, the lock screw 96 of the Z axis member 11 is loosened and the Z axis member 11 is transferred along the Z slider 9 keeping the measuring element 12 in touch with the side plane 71 which is in the vertical direction and at a right angle with the side plane 73.

Among each measured value in the X, Y Z axis directions in the middle of the transfer, the Y-Z axis adjustment mechanism 43 of the second means 30 for adjusting the angles is adjusted to change the measured value in the Z axis direction without changing that in the Y axis direction and the Y-Z axis adjustment mechanism 43 is fixed after the adjustment. The adjustment by the Y-Z axis adjustment mechanism 43 is conducted by rotating the eccentric pin 39 little by little with the bolts 33 loosened. The angle of the mounting of the second adjustment block 35 against the first adjustment block 32 is changed with the securing pin 38 at the center by the operation of the eccentric pin 39.

Therefore, because the angle of the Z axis member 11 supported by the Z slider 9 through the second adjustment block 35 against the Y axis member 8 fixed to the first adjustment block 32 is adjusted, the right angle between the both axis member 8 and 11 are fixed. The procedure of the adjustment by the Y-Z axis adjustment mechanism 43 is the same as that of the X-Y axis adjustment mechanism 25. That is, after the adjustment, the eccentric pin 39 is fixed with glue and so on, and the first and the second adjustment blocks 32, 35 are also fixed by screwing the bolts 33.

Moreover, the adjustment of the right angles between the Z axis member 11 and the X axis member 5 is done by operating the Z-X axis adjustment mechanism 48 in the second means 30 for adjusting the angle.

First, the Y axis member 8 is temporarily fixed to the Y slider 7 by a lock screw which is not shown in the drawings. Next, the right angle measurement standard is raised on the table 4 with the side 72 downward and the side 73 is positioned to be parallel with the X axis member 5 in that condition. The X slider 6 is transferred along the X axis member 5 maintaining the touch between the side 73 and the measuring element 12. During that time, the position of the side 73 of the right angle measurement standard 70 is adjusted not to change the measured value in the direction of the Y axis and the measurement standard 70 is fixed on the table 4 thereafter, whereby the side 73 of the angle measurement standard 70 is set in parallel to the X axis member 5.

In this way, when the side 73 of the right angle measurement 70 is set in parallel to the direction of the X axis, the Z axis member 11 is transferred along the Z slider 9 maintaining the contact between the measuring element 12 and the side 71 in vertical direction of the side 73 of the right angle measurement standard 70. Among each measured value in the directions of X, Y and Z axis during the transfer, the Z-X axis adjustment mechanism 48 is adjusted so that the measured value in the direction of the Z axis is changed without a change in the measured value in the direction of the X axis and the Z-X axis adjustment mechanism 48 is fixed thereafter. The adjustment by the Z-X axis adjustment mechanism is done by rotating the eccentric pin 45 little by little with the bolts 34 loosened. The mounting angle of the Z slider 9 against the second adjustment block 35 is changed around the securing pin 44 by operating the eccentric pin 45.

Therefore, the right angles between the X and Z axis members 5, 11 is set because the angle adjustment of the Z axis member 11 supported by the Z slider 9 is done in association with the second adjustment block 35 supported by the X axis member 5 through the first adjustment block 32, the Y axis member 8 and the X slider 6.

The adjustment procedure by the Z-X axis adjustment mechanism 48 is the same as that of the X-Y axis adjustment mechanism 25. Otherwise, after the adjustment, the eccentric pin 45 is fixed with glue and so on, and the second adjustment block 35 and the Z slider 9 are fixed by screwing the bolts 34.

The adjustment of the right angle between each axis members 5, 8, and 11 of the simple three-dimensional measuring machine 1 is completed as mentioned above. These adjustments are made by the experts in adjustment in the factory of the manufacturers.

The way of assembling and disassembling and transferring the measuring machine is explained below in the case of the shipment from the factory of the manufacturers and the installation in the factory of the users of the simple three-dimensional measuring machine 1 according to this embodiment.

The simple coordinate measuring machine 1, whose angle is adjusted in the above-mentioned procedure, has the X axis member 5 removed from the column 3 and the height adjustment pedestal 2 removed before being transferred.

Also, the Y-Z axis cover 17 is removed from the X slider 6 supported by the X axis member 5 in advance and Y slider 7 is removed at the boundary of the first means 20 for adjusting the angle with the second means 30 for adjusting the angle, the Z slider 9 and the Z axis member 11. That is, the securing bolts 82 to fix the X slider 6 and the Y slider 7 are removed and the both sliders 6 and 7 are separated respectively.

Figure 11:
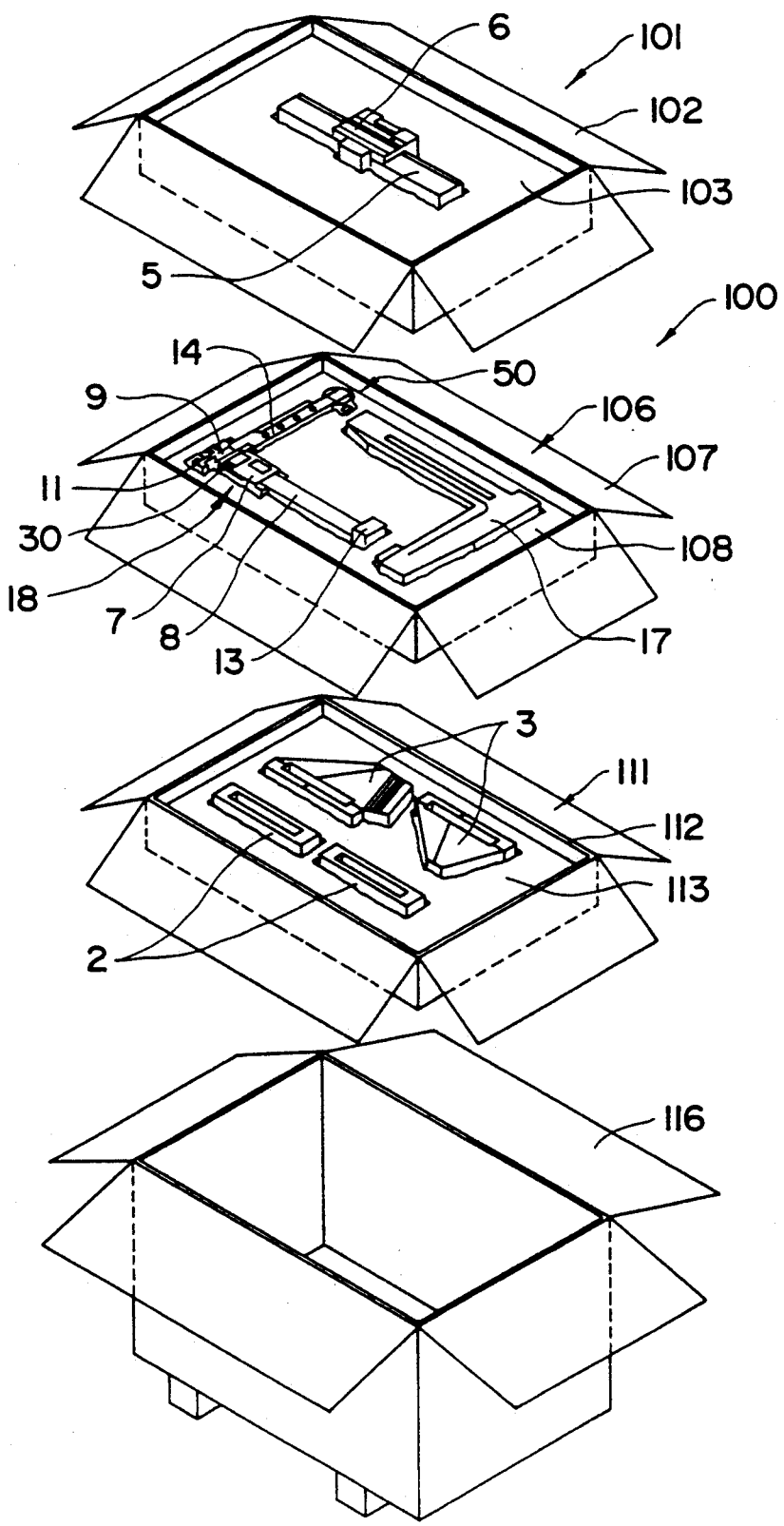
FIG. 11 is an exploded perspective view which shows the packing cases for transfer shown in FIG. 1.

The parts disassembled in each set unit in this way, are transported or transferred after being housed in the packing case 100 for transfer as is shown in FIG. 11.

The packing case 100 for transfer is organized with the packing case 101 for the X axis member part, the packing case 106 for Y-Z axis member part, the packing case 111 for the column parts and the exterior packing case 116 made of wood or corrugated cardboard which houses each packing case of 101, 106 and 111 piled up.

The packing case 101 for the X axis member part is to house the X axis member 5 and the X slider 6 separated from other members. This packing case 101 for the X axis member part is composed of the case 102 made of corrugated cardboard and the cushion material 103 made of the foaming relaxation material such as styrenes foam and plastic film and which is housed in the case 102. The cushion material 103 has a recess therein for housing the aforesaid components therein.

The packing case 106 for the Y-Z axis member part houses the Y axis member 8, the Y slider 7 which is attached to the Y axis member 8, the Z slider 9 mounted to the Y axis member 8 through the second means 30 for adjusting the angle, and the Z axis member 11 attached to the Z slider 9 in condition of all of which are put together, where the Y-Z axis assembled parts 18 which positions the Y axis member 8 and the Z axis member 11 in the letter L shape and the Y-Z cover 17 formed in the letter L shape which covers the circumference of the Y-Z axis assembled parts 18 are housed apart from the other members so that each opening of the letter L shape faces each other so as to outline a rectangle.

This packing case 106 for the Y-Z axis member part is composed of the case 107 made of corrugated cardboard and the cushion material which is made of styrenes foam material 108 and which is housed in the case 107. The cushion material 108 has two opposing L-shaped recesses therein outlining a rectangle for receiving these components therein.

The packing case 111 for the column part is housed with a pair of column 3 and the height adjustment pedestal 2 separated from other members. This packing case 111 for the column is composed of the case 112 made of corrugated cardboard and the cushion material 113 which is made of styrenes foam organizer and so on and is housed in the case 112. The cushion material 113 has plural recesses therein for receiving these components therein. Besides, when the height adjustment pedestal 2 is unnecessary, only a set of columns 3 are housed in the packing case 111 for the column part.

In this way, each packing case 101, 106 and 111 which houses each part separately is housed in the exterior packing case 116 and is transported or transferred to the factory of the users. In the factory of the users, each part is taken out of the each packing case 101, 106 and 111 and is assembled. Concretely, after the height adjustment pedestal 2 is attached to the pair of column 3 as necessity requires, the X axis member 5 with the X slider 6 is mounted between the pair of columns 3 with bolts which are not shown in Figure.

Next, the Y slider 7 in the Y-Z axis member parts 18 is mounted to the X slider 6 with the bolts 82. The fixation of the X slider 6 and the Y slider 7 is competed by screwing the bolts 82 in condition that the datum levels 23 and 24 of the first means 20 for adjusting the angle provided on one side of the Y slider 7 are urged to the securing pin 21 and the eccentric pin 22 of the first means 20 for adjusting the angle of the X slider 6. In this way, the X slider 6 and the Y slider 7 are assembled in the same condition as has the angle adjusted in the factory of the manufacturers and right angles between each axis members necessary for the three-dimensional measuring machine is easily set.

After this, the assembly of the simple three-dimensional measuring machine 1 is finished by putting the Y-Z axis cover 17 on the Y-Z axis member part 18 and connecting work of the wiring. Besides, the assembled three-dimensional measuring machine 1 can be used on the proper table 4 which is prepared by the users.

According to this embodiment mentioned above, the following effects are expected.

The simple three-dimensional measuring machine 1 concerning this embodiment enables the assembly and the disassembly at least between the column 3 and the X axis member 5 and between the X slider 6 and the Y slider 7. Each part is transferred disassembled and is assembled in condition of maintaining right angles because the first means 20 for adjusting the angle is provided between the X slider 6 and the Y slider 7. Therefore, the assembly of the three-dimensional measuring machine by the users is enabled, which has been considered difficult, which enables the simple three-dimensional measuring machine 1 to be sold through a general distribution system and consequently, less expensive and simple measuring machines can be supplied.

Also, the first means 20 for adjusting the angle is supplied to the market at a low price because it has a simple structure composed of the securing pin 21, the eccentric pin 22 and the datum levels 23, 24.

Moreover, each right angle between the Y axis member 8 and the Z axis member 11 and between the Z axis member 11 and the X axis member 5 are set easily because the second means for the adjusting the angle which has Y-Z axis adjustment mechanism 43 and the Z-X axis adjustment mechanism 48 between the Y axis member 8 and the Z slider 9. Also, because of the simple structure, it can be supplied at low price.

Also, because the height adjustment pedestal 2 can be attached to the column 3, the measuring range of the measuring element 12 can be adjusted vertically.

Moreover, the packing case 100 for transfer enables proper transfer because it has packing cases 101, 106 and 111 corresponding to each disassembled part. Especially, the packing case 106 for the Y-Z axis member part can be expected to be transferred with the Y-Z cover 17 saving the space because the Y axis member 8 and the Z axis member 11 are positioned in the letter L shape.

Also, the balance equipment 50 has effects that the structure is simple and miniaturized and that it does not require special operating power because the spiral spring 58 and the drum 53 are used in it.

Moreover, the measuring force suitable for the nature of the object to be measured is obtained easily because the spring power of the spiral spring 58 can be adjusted easily through the adjustment means 65. The adjustment operation is easy because the adjustment means 65 is composed of the worm 67, the worm wheel 66 and the operation axle 68 which has the control 69.

Moreover, since there is no fear of the reversed rotation of the operation axle 68 by the spring power of the spiral spring 58 because of the effects between the worm 67 and the worm wheel 66, the rotation stopping of the operation axle 68, the rotation axle 51 and the rotating drum 53 is secured with no special fixation means and the adjusted condition of the balance power is therefore maintained.

Also, the balance equipment 50 is transferred stably in transferring the three-dimensional measuring machine 1 by adjusting the spring power of the spiral spring 58 because it has no member which moves freely unlike conventional balance weight. Besides, needless to say, the Z axis member 11 can be fixed by the lock screw 96.

Also, replacing the spiral spring 58 with a thin spring having many coils can reduce the unevenness of the operation power because the change in the spring power by the spiral spring 58 can be reduced in the whole measuring area of the Z axis member 11.

Besides, the structure, the packing case for transfer and the adjustment method of the first embodiment are not limited to the one mentioned above. For example, in the first embodiment, the Z-X axis adjustment mechanism 48 is provided at the second means 30 for adjusting the angle but this Z-X axis adjustment mechanism can be provided with the first means 20 for adjusting the angle. In the Z-X axis adjustment mechanism 48 of this case, the Y axis member 8 is regarded as the X slider, the Z slider 9 as the Y slider and the second means 30 for adjusting the angle as the first means 20 for adjusting the angle in FIG. 6. Thus, the Z-X axis adjustment mechanism 48 is capable of providing the first or the second means 20, 30 for adjusting the angle.

Also, the Y axis member 8 and the Z axis member 11 can be disassembled at the factory between the first and the second adjustment block 32, 35 in the second means for adjusting the angle or between the second adjustment block 35 and the Z slider 9 and can be assembled at the end user's site. In this case, the datum levels 41, 46, 42, 47 are abutted to the securing pins 38, 44 and the eccentric pins 39, 45 and thereafter the bolts 33, 34 are screwed up tight.

As mentioned above, the Y axis member 8 and the Z axis member 11 can be in a disassembled condition but from the standpoint of packing case for them with the Y-Z axis cover 17, the use of the packing case for the Y-Z axis member of the first embodiment is not expected to have an advantage of saving space.

Moreover, in the first and the second means 20, 30 for adjusting the angle, these means for adjusting the angle do not have to be composed of the securing pins 21, 38 and 44, the eccentric pins 22, 39 and 45, and the datum levels 23, 24, 41, 42, 46 and 47 but it can have other structures. Taking the X slider 6 and the Y slider 7 for example, the X slider 6 includes the securing pin 121 and the adjustment screw 122 screwed through the bracket 126 while the Y slider 7 which is fixed to the X slider 6 with the bolts 82 can be composed of the datum levels 123, 124 corresponding to the securing pin 121 and the adjustment screw 122.

In such structures, when the adjustment screw 122 is operated, the angle between the X slider 6 and the Y slider 7 is adjusted like the first embodiment. But, following the method in the first embodiment, there are advantages of saving the mounting space and reducing the number of the parts.

Also, in the first embodiment, whenever each of the right angles between the Y and Z axis members 8, 11 and between the Z and X axis members 11, 5 is adjusted, the side 73 of the right angle measurement standard 70 is put parallel to the direction of the Y axis or the X axis but if the height of the right angle measurement standard 70 is made higher in the direction of the height of the sides 71, 72 than that is shown in FIG. 1, for example, if it is as tall as the height of the right angle measurement standard with the side 73 downward, it is unnecessary to adjust the side 73 of the right angle measurement standard 70 to the parallel direction of the Y or X axis.

In other words, when the one side 71 of the right angle measurement standard is adjusted to the X axis direction in advance on the occasion of adjusting the right angles between the X and Y axis members 5, 8, the other side 72 becomes inevitably parallel to the Y axis direction. Therefore, in adjusting the right angles between the Y and Z axis members 8, 11 and between the Z and X axis members 11, 5, since the height of the sides 71, 72 are tall, the Y-Z or Z-X axis adjustment can be made by transferring the measuring element 12 in the Z axis direction using the other side 72 or the one side 71 with the right angle measurement standard 70 fixed.

Therefore, if such an adjustment way is adopted using a large right angle measurement standard, it is expected to have an advantage of making the adjustment easier.

Also, the balance equipment 50 may be composed of a weight and an air cylinder but if the structure of the first embodiment is used, it is expected to have advantages of small size and simplicity as mentioned above. The balance equipment 50 may be attached not only to the upper end of the body 14 but to the lower part or even to the Y-Z axis cover 17 as long as the hardness can be maintained. To sum up, the balance equipment 50 has only to be mounted to the part connected to the Z slider 9 and the structure which balances with the weight of the Z axis member 11 and so on.

Moreover, the height adjustment pedestal 2 is not always necessary. Also, the shape of each part and so on don't have to be limited to those of the first embodiment.

Figure 13:
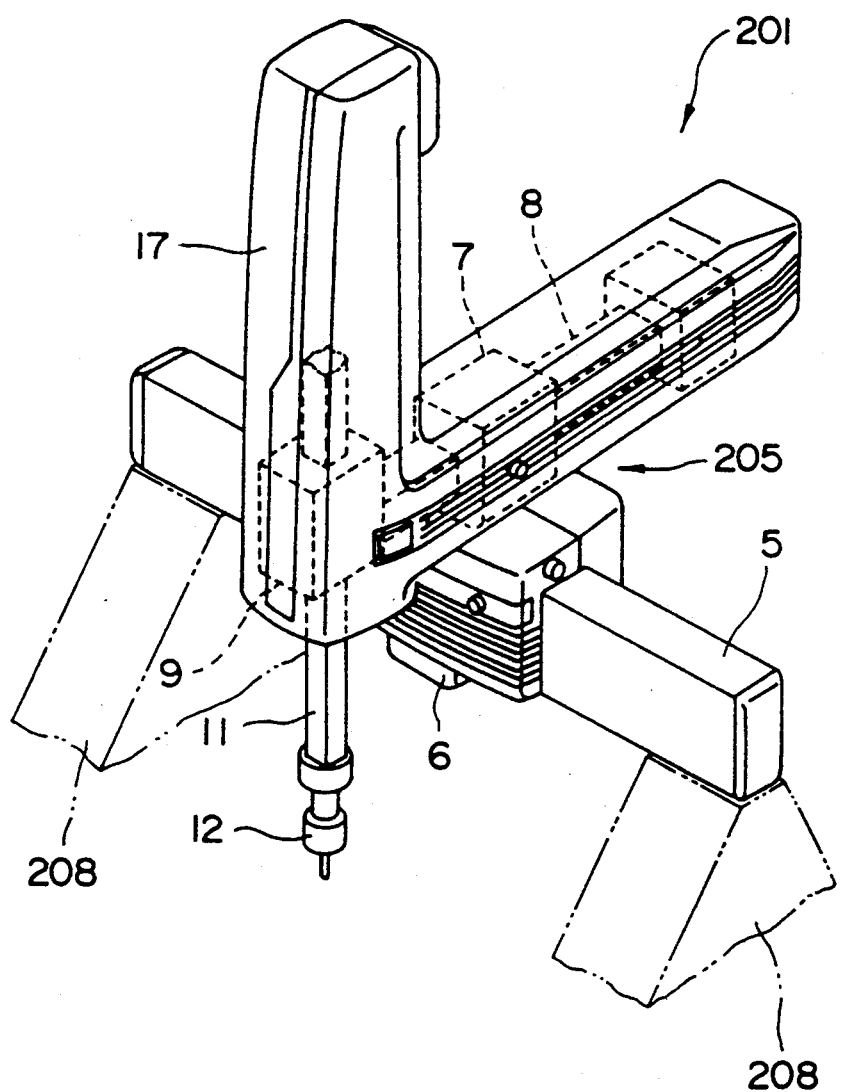
FIG. 13 is a perspective view which shows the second embodiment of the present invention.

The simple three-dimensional measuring machine 201 concerning the second embodiment of the present invention is shown in FIG. 13. This second embodiment is composed of the three coordinate measurement machine concerning the first embodiment whose a pair of columns 3 and the height adjustment pedestal 2 are removed. Therefore, correctly, the simple three-dimensional measurement machine 201 is considered as a head for the three-dimensional measurement machine but the second embodiment is also called the three-dimensional measurement machine in this specifications from the point that the three-dimensional measurement machine is composed by fixing the X axis member 5 to a proper member.

Incidentally, same marks are used to the same or similar components in each embodiment mentioned below as those of the first embodiment and the explanation of them is omitted or simplified.

Though the simple three-dimensional measurement machine 201 concerning the second embodiment has some differences in appearance, it has the same members as that concerning the first embodiment except for the columns 3.

That is, the three-dimensional measurement machine 201 has the X axis member 5, where the X slider 6 is supported to slide freely. The Y axis member 8 is supported by the X slider 6 to slide freely in the axis direction through the Y slider 7 and the Z axis member 11 is supported through the Z slider 9 by the end of this Y axis member 8 to slide freely vertically. The measuring element 12 is mounted to the lower end of the Z axis member 11 and the balance equipment, which is not shown in the drawings, is connected to the upper end. The Y-Z axis cover 17 in the shape of the letter L is mounted to cover the Y slider 7, the Y axis member 8 and the Z slider 9.

Besides, the slide unit 205 is composed of the X slider 6, the Y slider 7, the Y axis member 8, the Z slider 9, the Z axis member 11, Y-Z axis cover 17, the members of the balance equipment which is not shown in the drawings, that is, the members which slide with X slider 6 along the X axis member 5.

The both ends of the X axis member 5 of the simple three-dimensional measurement machine 201 are formed to be supported by the support member 208 with a proper structure prepared by the users.

When the simple coordinate measurement machine 201 concerning the second embodiment is used, first, the X axis member 5 is mounted to the support member 208 and the foundation which is not shown in the drawings is positioned corresponding to the position where the three-dimensional measurement machine 201 is mounted. The measurement is made with the object to be measured set on the table.

The shape of the packing case for transfer and the method of angle adjustment in the simple three-dimensional measurement machine concerning the second embodiment are the same as those of the first embodiment. Of course, in this case, the packing case for the column parts is not used as a packing case for transfer.

In the second embodiment, too, the same effects as those in the first embodiment are achieved, and moreover, the variation of the shapes of the support member 208 for the users is increased because the column is not used. As a result, it has an advantage of supplying the measurement machine at a low price.

Figure 14:
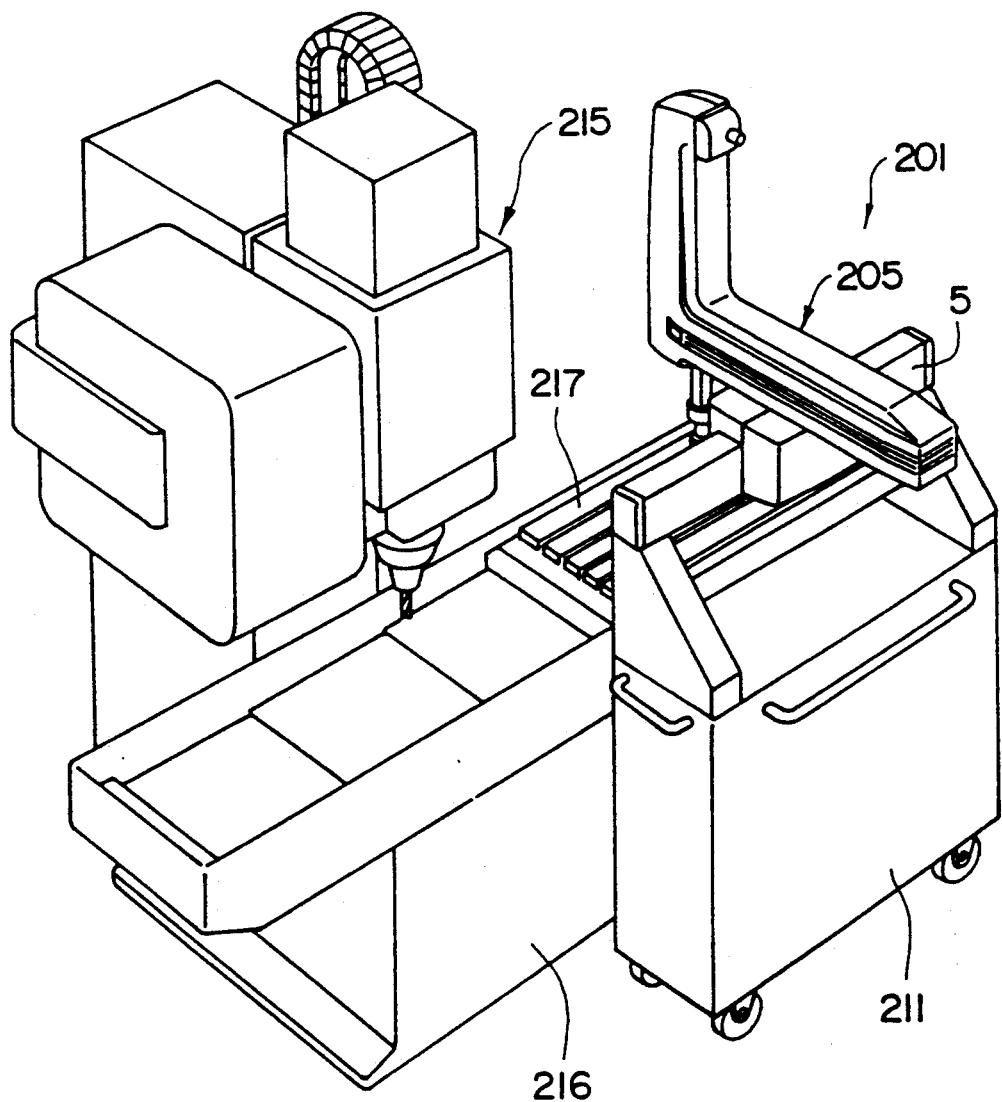
FIG. 14 is a perspective view which shows the third embodiment in the case that the present invention is applied to the finishing machine.

The third embodiment of the present invention is shown in FIG. 14. This embodiment shows an example of the simple three-dimensional measurement machine 201 shown in FIG. 13 applied to the actual facilities.

In FIG. 14, the simple three-dimensional machine 201 is mounted on the movable carriage 211 as a support member prepared by the users through the X axis member 5. This movable carriage 211 is made into the shape which enables it to be positioned adjoining the bed 216 of the machining center 215, which is a finishing machine, and it is composed to measure the objects to be measured which are not shown in the drawings put on the table 217 of the machining center 215. In this case, the table 217 has a role of a foundation.

In this third embodiment, if the shape of the movable carriage 211 is designed properly, the object to be machined (work) can be measured directly at the machining site. The machining condition of the work is measured in real time to prevent the production of inferior goods.

Figure 15:
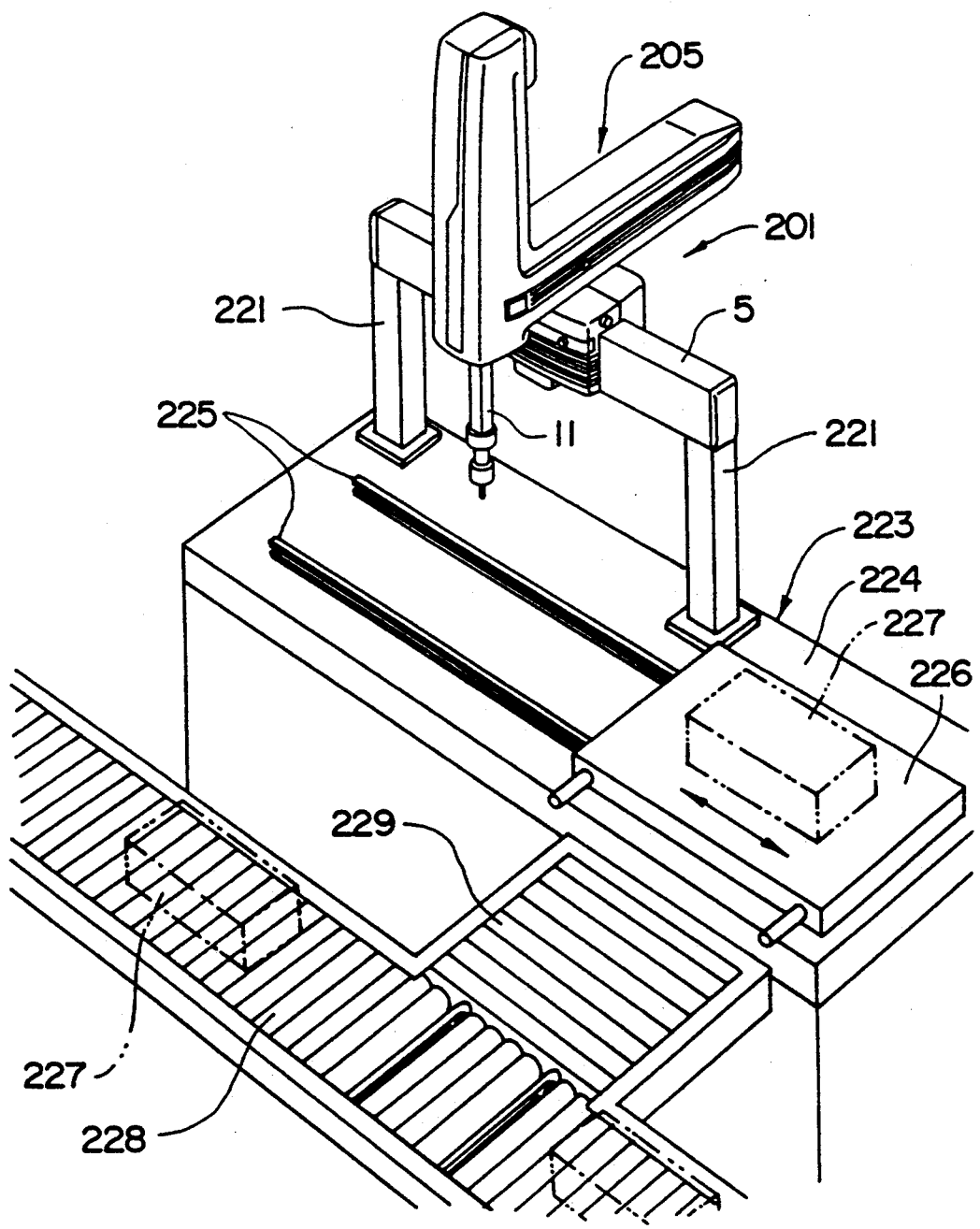
FIG. 15 is a perspective view which shows the forth embodiment in the case that the present invention is applied to the measurement station in the production line.

In FIG. 15, the fourth embodiment which applies the simple three-dimensional measurement machine 201 concerning the second embodiment to the actual production line is shown.

In the fourth embodiment, the X axis member in the simple three-dimensional measurement machine 201 is mounted on the pair of columns 221 serving as the support member prepared by the users. The pair of columns 221 are upstanding at the measurement station 223. The measurement station 223 is provided with the bed 224, on which the table 226 as a foundation is provided to slide freely in the direction of the arrow through a pair of rail 225. The object to be measured 227 is put on the table 226 and it is measured by the measuring element 12 of the simple measurement machine 201.

The roller conveyor 228 to convey the object to be measured 227 is provided on the side of the measurement station 223 and the object to be measured 227 is conveyed to the table 226 by the branch roller conveyor 229 which extends transversely to the roller conveyer 228. Besides, the movement of the object to be measured 227 from the branch roller conveyer 229 to the table 226 can be conducted by human hands or by automatic equipment which is not shown in the drawings. The transfer of the table 226 in the arrow direction can be conducted by human hands or automatically, too.

The fourth embodiment has an advantage of efficiently measuring the objects to be measured 227 in the middle of a production line. Also, it has the advantage that users can change the shape and the structure of the measurement station 223 arranged in the production line as they like.

In FIG. 16, the fifth embodiment of the present invention is shown.

The simple three-dimensional measurement machine 231 is composed of two units of the X axis member 5 and the slide unit 205 in the second embodiment. A stopper which is not shown in the drawings can be provided on the X axis member 5 to prevent each slide unit 205 from colliding or a shock absorbent mechanism which also is not shown in the drawings can be provided with each slide unit 205. It is composed not to cause the reduction in precision of the unit 205 but to lessen the shock when each slide unit 205 collides.

Both ends of the X axis member 5 of the simple three-dimensional measurement machine 231 concerning this embodiment are supported by the pair of columns 233 serving as a support member prepared by the users. This pair of columns 233 are supported by the pedestals 234 and the roller conveyer 235 and 236 are set in parallel on both sides thereof. The object to be measured is put on these roller conveyers 235, 236 through the conveyer stand 237 as a table and is transferred.

The measurement in the case of this embodiment is executed by touching the measuring element 12 of the slide unit 205 with the object to be measured 238 just as in general three-dimensional measurement machines.

In the fifth embodiment, a device to make the size of the pedestal 234 smaller can narrow the interval between the pair of the roller conveyers 235, 236, the space for setting up the conveyer in the production line can be smaller. Also, because two slide units 205 are mounted on one X axis member 5, the number of parts is small and the price can be lowered as a result. Moreover, the measurement on the adjacent two roller conveyers 235, 236 is conducted at the same time even though the slide units 205 are reversed from each other. Moreover, when one slide unit 205 is moved to one side, the measuring range of the other slide unit 205 becomes larger.

Incidentally, more than two slide units 205 can be provided with the fifth embodiment, but the number should be limited properly considering the rigidity of the X axis member 5. Also, the slide units 205 can be composed not only to be set in reverse, but to be set in the same direction to measure the different positions of the object to be measured respectively on one roller conveyer.

As mentioned above, the present invention is explained according to more than one embodiments, but the present invention is not limited to each embodiment mentioned above, and further improvement and deformity are included in the present invention as long as the purposes of the present invention can be achieved.

According to the present invention mentioned above, the structure is simple and it is easy to assemble or disassemble. Therefore, it has the effect of providing a simple three coordinate measurement machine which can be transferred easily, a packing case for transfer with a simple structure, and even a simple method for adjusting right angles.

What is claimed is:

1. A simple three-dimensional measuring machine, comprising:
   a X axis member;
   a X slider supported to slide freely in a horizontal X axis direction along said X axis member;
   a Y slider;
   a Y axis member supported to slide freely in a horizontal Y axis direction relative to said Y slider;
   first means for angularly adjustably connecting said X slider and said Y slider;
   a Z slider;
   a Z axis member supported to slide freely relative to said Z slider in a vertical Z axis direction and has support means for supporting a measuring element at a lower end thereof;
   second means for angularly adjustably connecting said Z slider and said Y axis member;
   a counterbalance mechanism mounted on said Z slider and having a sufficient balance power corresponding to a weight of said Z axis member, said counterbalance mechanism including means connected to said Z axis member so as to counter balance the weight of said Z axis member.

2. The simple three-dimensional measuring machine according to claim 1, wherein said X axis member is assembled to and disassembled from a support member with means being provided for facilitating an establishment of the X axis direction.

3. The simple three-dimensional measuring machine according to claim 2, wherein the support member consists of a pair of columns.

4. The simple three-dimensional measuring machine according to claim 1, wherein said first means includes a X-Y axis adjustment mechanism capable of adjusting at least right angles between said X axis member and said Y axis member, wherein said second means includes a Y-Z axis adjustment mechanism capable of adjusting at least right angles between said Y axis member and said Z axis member, and wherein at least one of said first means and said second means includes a Z-X axis adjustment mechanism capable of adjusting at least right angles between said Z axis member and said X axis member.

5. The simple three-dimensional measuring machine according to claim 1, wherein said first means and said second means include two datum levels provided at predetermined intervals, on one of a pair of members adjacent to one another and whose angular relationship is to be adjusted, a securing pin provided on the other of the pair of members and contacting one of the two datum levels, and a rotatable eccentric pin contacting the other datum level, whereby the angle between the pair of members can be adjusted by rotation of the eccentric pin.

6. The simple three-dimensional measuring machine according to claim 1, wherein said Y axis member and said Z slider connected to and disconnected from one another at said second means.

7. The simple three-dimensional measuring machine according to claim 3, wherein said support member includes height adjustment pedestals attached to or removed from a lower portion of said columns.

8. The simple three-dimensional measuring machine according to claim 1, wherein said X slider, Y slider, Y axis member, Z slider, Z axis member and counterbalance mechanism are assembled to define a slide unit.

9. A packing case for facilitating a transport of a simple three-dimensional measuring machine, comprising:
- a first packing case for housing a X axis member and a X slider related to the X axis member apart from other members;
- a second packing case for housing a Y axis member, a Y slider related to the Y axis member, a Z slider attached to the Y axis member through second means for angularly adjustably connecting said Z slider and said Y axis member, a Z axis member slidably related to a Z slider, all of which are assembled together into an L-shape, said second packing case having a pair of opposed L-shaped protective recesses therein outlining a rectangle, the assembled components, as aforesaid, including an L-shaped covering for the L-shaped assembly, both of said L-shaped assembly and said L-shaped covering therefor being received in an associated one of said L-shaped recesses; and
- an exterior packing case to house said first and second packing cases one on top of the other.

10. A packing case for facilitating a transport of a simple three-dimensional measuring machine, comprising:
- a first packing case for housing only a pair of columns or a pair of columns and a height adjustment pedestal as first members of an assembly separated from other members;
- a second packing case for housing a X axis member and a X slider related to the X axis member as second members of the assembly separated from the other member;
- a third packing case for housing a Y axis member, a Y slider related to the Y axis member, a Z slider attached to the Y axis member through second means angularly adjustably, connecting said Z slider and said Y axis member, a Z axis member slidably related to the Z slider, all of which are assembled together into an L-shape, said second packing case having a pair of opposed L-shaped protective recesses therein outlining a rectangle, the assembled components, as aforesaid, including an L-shaped covering for the L-shaped assembly, both of said L-shaped assembly and said L-shaped covering therefor being received in an associated one of said L-shaped recesses; and
- an exterior packing case to house said first, second and third packing cases one on top of the other.

* * * * *

UNITED STATES PATENT AND TRADEMARK OFFICE
CERTIFICATE OF CORRECTION

PATENT NO. : 5 291 662
DATED : March 8, 1994
INVENTOR(S) : Sadayuki MATSUMIYA et al.

It is certified that error appears in the above-identified patent and that said Letters Patent is hereby corrected as shown below:

Column 18, line 15; delete ",".

Signed and Sealed this

Thirtieth Day of August, 1994

*Attest:*

BRUCE LEHMAN

*Attesting Officer*  *Commissioner of Patents and Trademarks*